United States Patent [19]

Chande et al.

[11] Patent Number: 4,744,627
[45] Date of Patent: May 17, 1988

[54] OPTICAL FIBER HOLDER

[75] Inventors: Tushar S. Chande, Schenectady; Gregory Georgalas, Bronx; Angel L. Ortiz, Jr., Ballston Lake; Marshall G. Jones, Scotia; John L. August, Jr., Schenectady, all of N.Y.

[73] Assignee: General Electric Company, Schenectady, N.Y.

[21] Appl. No.: 926,281

[22] Filed: Nov. 3, 1986

[51] Int. Cl.⁴ .............................................. G02B 6/42
[52] U.S. Cl. ................................................ 350/96.20
[58] Field of Search ............... 350/96.15, 96.17, 96.20; 372/6

[56] References Cited

U.S. PATENT DOCUMENTS

| | | | |
|---|---|---|---|
| 3,843,865 | 10/1974 | Nath | 219/121 L |
| 3,920,980 | 11/1975 | Nath | 240/1 LP |
| 4,466,696 | 8/1984 | Carney | 350/96.2 |
| 4,564,736 | 1/1986 | Jones et al. | 219/121 L |
| 4,639,074 | 1/1987 | Murphy | 350/96.2 X |

OTHER PUBLICATIONS

Ealing Optics Catalog 84/85 published by the Ealing Corporation, p. 277.
Manufacturer information on fiber optic glass connector sleeves provided by Robolase Systems Incorporated.

Primary Examiner—Eugene R. LaRoche
Assistant Examiner—Steven J. Mottola
Attorney, Agent, or Firm—Richard V. Burgujian; James C. Davis, Jr.; Paul R. Webb, II

[57] ABSTRACT

An optical fiber holder includes a pair of flat, adjacent surfaces. Each of the surfaces includes a straight groove, the grooves opposing so as to form a passage shaped to engage an optical fiber in a snug fit. Means are provided for fastening the two surfaces together. The optical fiber holder is preferably constructed of material transparent to a laser beam at a predetermined wavelength, thereby making the optical fiber holder particularly adapted for use with a laser device generating such a laser beam.

31 Claims, 5 Drawing Sheets

OPTICAL FIBER HOLDER

This invention relates generally to optics and more particularly to optical fiber holders.

BACKGROUND OF THE INVENTION

With the increased use of high-power laser systems in industrial applications, it is becoming increasingly desirable to utilize a single, high-power laser device to perform multiple tasks. For example, a single high-power neodymium laser generating a 400 watt (average power) laser beam can be used as part of an industrial workstation to drill multiple holes in a single work piece. To avoid moving the laser device a substantial distance, optical fibers are employed to transmit the laser beam in a sequential or multiplexed manner to multiple locations on the work piece. Accordingly, an optical fiber holder is used to position the optical fibers relative to the laser device so that they can be coupled with the laser beam. It has been recognized in the art that precise positioning of the optical fibers is required to efficiently couple the laser beam with the optical fiber: i.e. to precisely direct the laser beam into the diametric aperture of the optical fiber tip.

Typical optical fiber holders are constructed with technology derived from low-power, optical fiber communications connectors. These optical fiber holders employ one or more optical fibers sealed, or "potted", into position in a metal holder by a resin disposed between the fiber and the holder. Because these optical fiber holders were originally designed to meet the requirements of communications applications, they exhibit substantial disadvantages when used in laser workstations of the type described above. One major disadvantage is that, once an optical fiber is potted into position, it is prohibitively difficult to adjust, replace or repair it in the holder. This is particularly disadvantageous when the optical fiber holder supports an array of multiple optical fibers, and one of the fibers is damaged. Further, it is difficult to precisely align a plurality of optical fibers in an array before potting them into position, and difficult to realign a fiber if it should be jostled out of position.

The disadvantages exhibited by these prior art optical fiber holders are particularly apparent in applications requiring the use of high-power laser devices. This is so because any misalignment of the optical fibers will result in stray beams which are absorbed by and cause damage to the potting material. Continuous exposure of the optical fiber holder to these stray beams will cause burning and deformation of the potting material, and eventually make the optical fibers held therein unusable due to misalignment. Further, the heat generated in the optical fiber holder will damage the optical fibers, impairing their transmission capabilities.

Accordingly, it would be desirable to provide an optical fiber holder particularly adapted for use with high-power laser systems. Such an optical fiber holder should precisely position one or more optical fibers. It should permit damaged fibers to be easily replaced without substantially altering the positions of the remaining good fibers. It should be impervious to damage caused by stray laser beams resulting from misalignment between the optical fibers and the laser device. Further, it should maintain the precise positioning of the optical fibers during periods of normal operation.

OBJECTS OF THE INVENTION

An object of the present invention is to provide a new and improved optical fiber holder capable of accurately positioning one or more optical fibers.

Another object of the present invention is to provide an optical fiber holder which firmly supports one or more optical fibers such that bending of remote portions of the fibers does not alter the location of the fiber tips.

A further object of the present invention is to provide an optical fiber holder which permits easy replacement of one of a plurality of damaged fibers without substantially disturbing the position of the remaining fibers.

Yet another object of the present invention is to provide an optical fiber holder comprised of material essentially transparent to a laser beam of a predetermined wavelength, thereby making the optical fiber holder particularly suited for use with high power laser devices.

SUMMARY OF THE INVENTION

A new and improved optical fiber holder constructed in accordance with the present invention includes a base, cap and means for affixing the two together, the base and cap preferably comprised of material substantially transparent to a laser beam at a preselected wavelength. The base includes a generally flat base surface having at least one substantially straight groove traversing there across. The cap includes a substantially flat cap surface adjacent the base surface also including at least one substantially straight groove traversing there across. The groove in the cap surface is disposed opposite the groove in the base surface such that, when the affixing means are used to affix the cap and base together, these grooves form a passage shaped to accommodate an optical fiber in a snug fit.

In preferred embodiments of the invention, each of the grooves is either semi-circular or V-shaped in cross section. Each groove is machined into its respective surface to a distance selected such that, with an optical fiber in the passage, a space is maintained between the base and cap surfaces. Further, a body of material substantially transparent to the laser beam is preferably positioned adjoining, and fixed relative to, the cap and base. This body includes a separate hole extending there through coaxially with each of the passages, these holes being shaped to engage the optical fibers in a sliding fit.

BRIEF DESCRIPTION OF THE FIGURES

While the specification concludes with claims defining the features of the invention that are regarded as novel, it is believed that the invention, together with further objects thereof, will be better understood from a consideration of the following description in conjunction with the drawing FIGURES, in which:

DETAILED DESCRIPTION OF THE INVENTION

Figure 1:
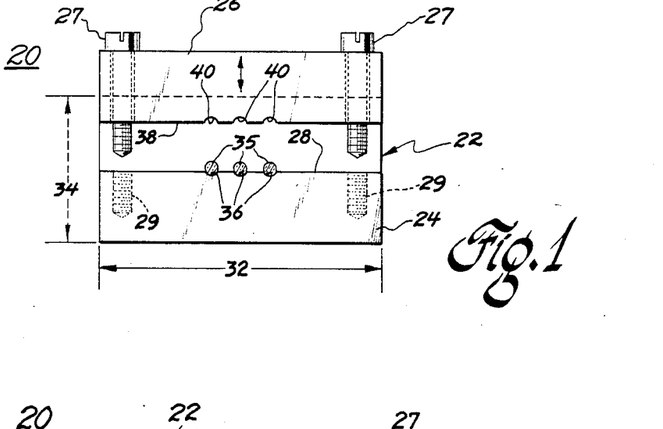
FIG. 1 is a front view illustrating an optical fiber holder constructed in accordance with a first embodiment of the invention and disposed in a position for receiving or removing an optical fiber.
Figure 2:
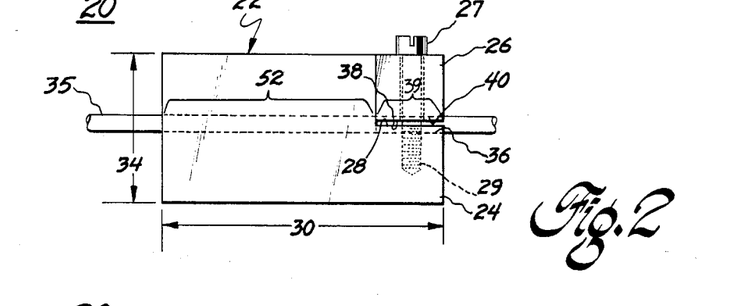
FIG. 2 is a side view of the optical fiber holder of FIG. 1 disposed in a position for snugly holding optical fibers.

Referring now to FIGS. 1 and 2, an optical fiber holder 20 is shown comprising a body 22 including a base portion 24, and a removable cap 26. FIG. 1 shows optical fiber holder 20 with cap 26 separated from base 24, while FIG. 2 shows the cap secured to the base via a pair of threaded screws 27 and opposing threaded holes 29. As is best shown in FIG. 2, body 22 is generally L-shaped with base portion 24 comprising a generally rectangular lip thereon. With cap 26 secured to body 22 (FIG. 2), optical fiber holder 20 is generally rectangular in shape, including mutually perpendicular length, width, and height dimensions indicated at 30, 32 and 34, respectively. Three optical fibers 35 are held in optical fiber holder 20 in a manner described in detail hereinbelow.

Base portion 24 of body 22 includes a substantially flat surface 28 disposed in a plane perpendicular to height dimension 34, and having three parallel grooves 36 of semicircular cross section traversing there across in a direction parallel to length dimension 30. Cap 26 includes a substantially flat surface 38 which, with the cap secured to base 24, is positioned adjacent base surface 28. Cap surface 38 includes three parallel grooves 40 of semicircular cross section traversing there across, each groove 40 disposed opposite one of grooves 36.

Figure 3:
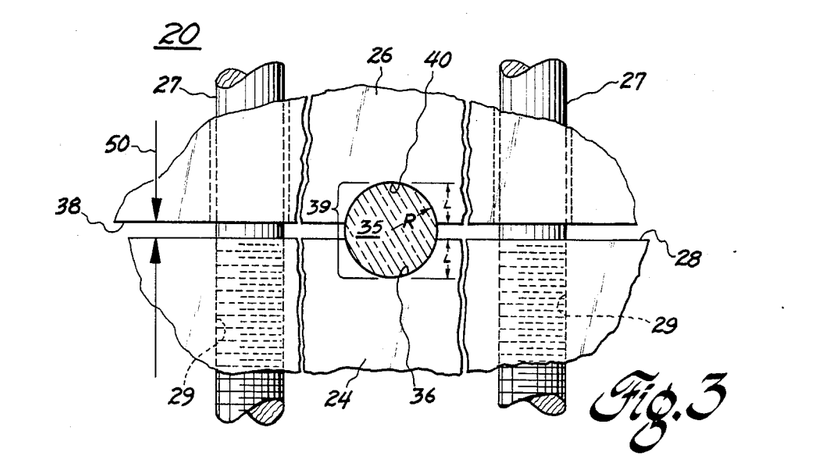
FIG. 3 is a front view of a passage 39 of FIGS. 1 and 2, enlarged to better illustrate details thereof.

Referring now to FIGS. 2 and 3, with cap 26 secured to base 24, grooves 36 and 40 oppose to form three passages 39. Passages 39 are indicated in side view in FIG. 2. FIG. 3 shows an enlarged portion of optical fiber holder 20, illustrating details of surfaces 28, 38, grooves 36, 40, and a front view of one passage 39. In one preferred embodiment of the invention, each groove 36, 40 is formed as an arc on a radius R equal to the radius of a fiber 35. Grooves 36, 40 extend a distance L into their respective surfaces, 28, 38, L being less than radius R. With cap 26 secured to base 24, and an optical fiber 35 in passage 39 thus remains between surfaces 28, 38. Grooves 36, 40 are formed, for example, by shimming surfaces 28, 38 so that they are separated by gap distance 50, and drilling passage 39 with a cylindrical drill bit of radius R.

As is best illustrated in FIG. 2, body 22 further includes three holes 52, one hole being disposed coaxially with each of passages 39. Holes 52 are preferably selected to be of slightly larger diameter than optical fibers 35 for engaging the optical fibers in a sliding fit. Such sliding fit holes can be countersunk to facilitate insertion of fibers into the fiber holder.

In the preferred embodiment of the present invention shown and described in FIGS. 1-3, cap 26 and body 22 including base 24 each comprise a material substantially transparent to a laser beam at a predetermined wavelength. For example, and without limitation, if optical fiber holder 20 is desired to be used with a neodymium laser system emitting a laser beam of 1.06 micron wavelength, the optical fiber holder preferably comprises quartz, which is substantially transparent to such a laser beam.

In operation, to insert an optical fiber 35 into optical fiber holder 20, cap 26 is loosened relative to base 24 by loosening screws 27 in holes 29. An optical fiber 35 is then slid through a hole 52 and rested in the coaxial groove 36. To secure all three optical fibers 35 against motion, screws 27 are then tightened in threaded holes 29. Optical fibers 35 are thus snugly secured within passages 39 formed by grooves 36, 40, against motion. To replace, for example, a damaged one of optical fibers 35, screws 27 are slightly loosened such that the optical fibers are no longer snugly secured in passages 39. With screws 27 slightly loosened, the damaged optical fiber is removed by sliding it out of its passage 39 and corresponding hole 52. A new optical fiber 35 is slid into position in a respective hole 52 and passage 39. Screws 27 are then tightened to snugly secure all of the optical fibers into position. One significant advantage of the present invention is that any one of the three optical fibers 35 can be quickly and easily removed and/or replaced without significantly disturbing the position of the remaining optical fibers.

Another significant advantage of the present invention is that, due to its composition of substantially entirely laser beam-transparent materials, any stray laser beam impinging on optical fiber holder 20, will pass harmlessly there through. Thus, optical fiber holder 20 is particularly suited for use with high power laser systems, wherein a stray laser beam might otherwise damage an optical fiber holder not transparent thereto. As a further feature of the present invention, screws 27 can be fabricated of the same laser beam-transparent material as the remainder of optical fiber holder 20.

Figure 3A:
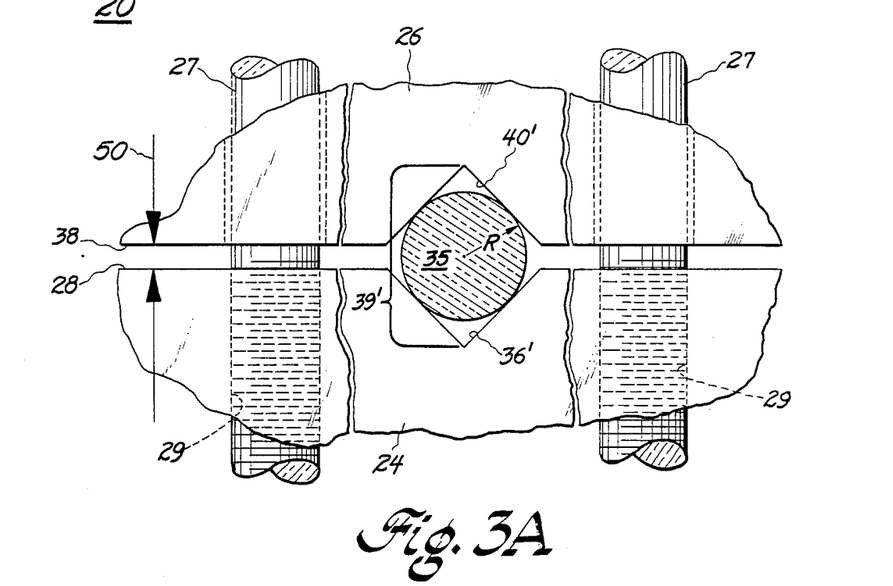
FIG. 3A is a view similar to FIG. 3 showing an alternate embodiment of the passage.

Referring now to FIG. 3A, an alternate embodiment of optical fiber holder 20 is shown wherein "V" shaped grooves 36', 40' replace semi-circular grooves 36, 40, respectively, to form a quadrangular passage 39'. All remaining features of optical fiber holder 20 are identical to those described above. Because V-shaped grooves 36', 40' are relatively easier and less expensive to manufacture than semi-circular grooves 36, 40, this embodiment of the optical fiber holder 20 is relatively easier and less expensive to manufacture than that described in FIGS. 1-3 above, while providing all of the same features and advantages.

Figure 4:
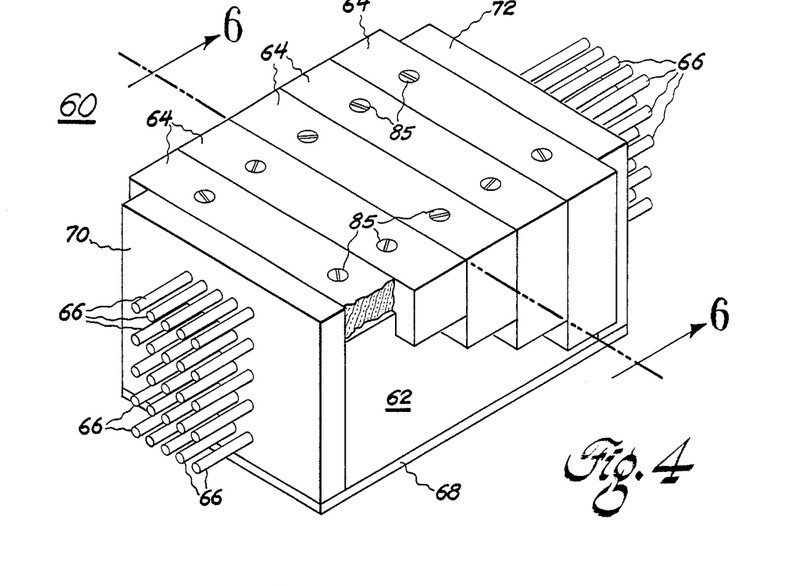
FIG. 4 is a perspective view of an optical fiber holder constructed in accordance with an alternate embodiment of the invention.

Referring now to FIG. 4, a second embodiment of the invention is shown comprising an optical fiber holder 60 including a body 62 and five rectangular, removable caps, each indicated as 64. In a manner described in detail hereinbelow, optical fiber holder 60 holds twenty-five optical fibers 66 in a five-by-five array. Body 62 is secured to a mounting plate 68, while a pair of optional end-plates 70 and 72 are similarly secured to the mounting plate and adjoin opposite longitudinal ends of optical fiber holder 60. As described with respect to FIGS. 1-3 above, body 62, caps 64 and end-plates 70, 72 preferably comprise material substantially transparent to a laser beam at a predetermined wavelength.

Figure 5:
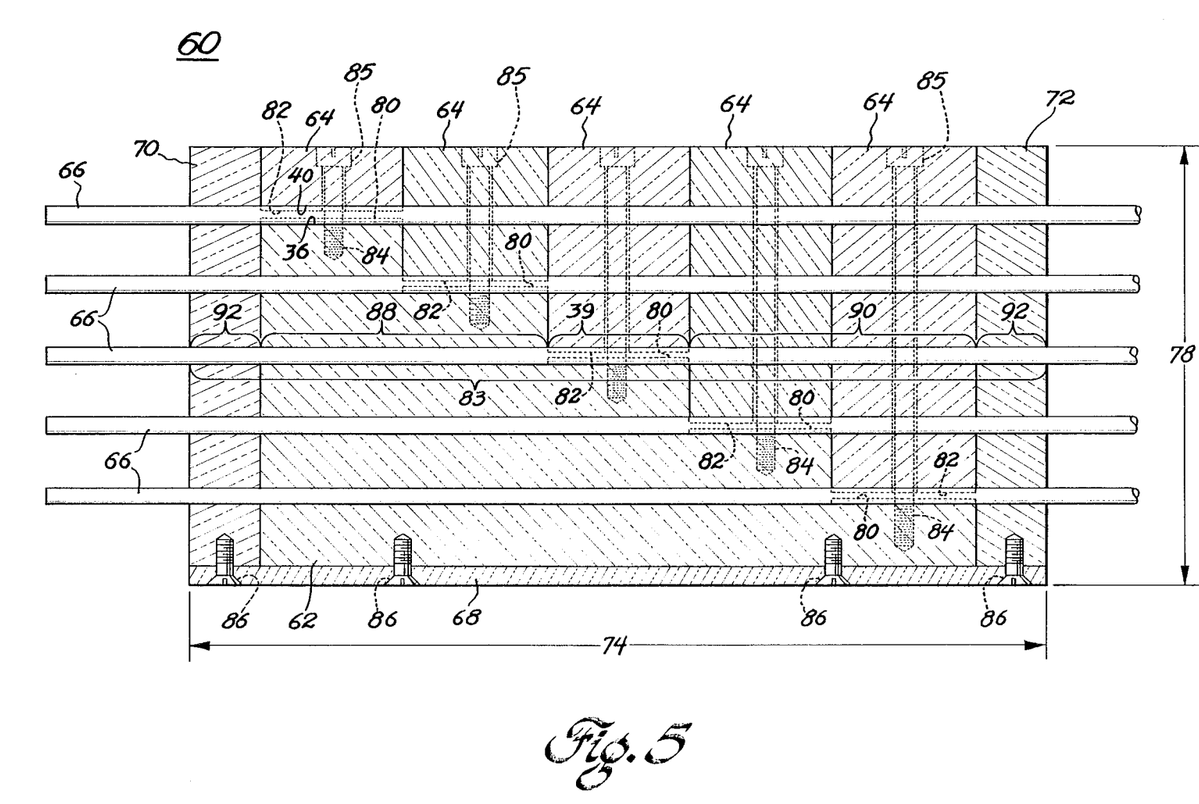
FIG. 5 is a sectional view taken along line 5—5 of FIG. 6.
Figure 6:
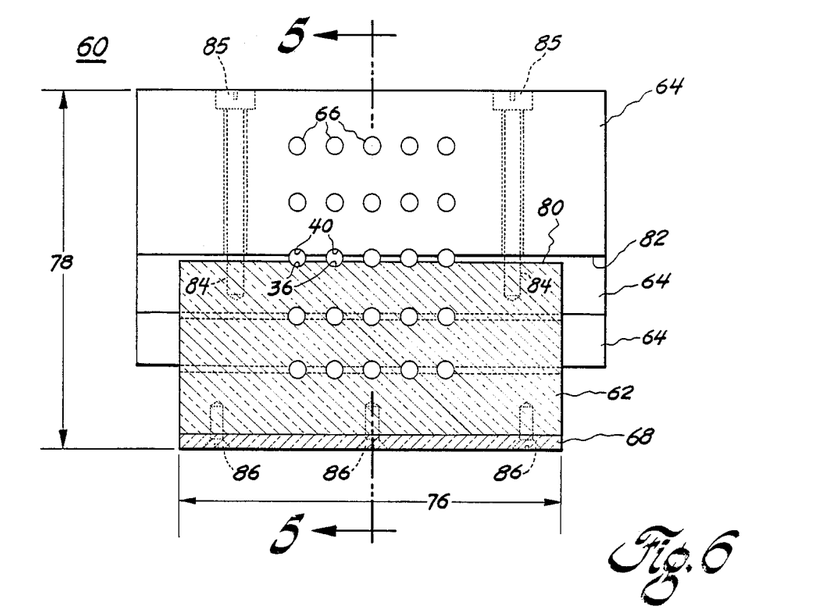
FIG. 6 is a sectional view taken along line 6—6 of FIG. 4.

Referring now to FIGS. 5 and 6, optical fiber holder 60 is seen to be generally rectangular in shape and to include mutually perpendicular length, width and height dimensions 74, 76, and 78, respectively. It will be noted that, as shown and for reasons described below, caps 64 preferably protrude a short distance beyond body 62 in width dimension 76. As is best shown in FIG. 5, body 62 includes five adjacent, substantially flat, body surfaces 80, each body surface being disposed in a separate plane, the planes being mutually parallel and perpendicular to height dimension 78. Surfaces 80 are further disposed in a stepped arrangement relative to one another in height dimension 78, the surfaces progressing from left-to-right (FIG. 5), highest-to-lowest relative to plate 68. Each cap 64 includes a substantially flat cap surface 82 adjoining a corresponding body surface 80. As is also best shown in FIG. 5, each optical fiber 66 is disposed in a channel 83, only one of which is numbered for purposes of explanation.

Each base surface 80 includes five, spaced, parallel grooves 36 traversing there across in a direction parallel to length dimension 74, grooves 36 being identical in construction to those shown and described in FIGS. 1-3 above. Similarly, each cap surface includes five grooves 40, also identical in construction to those shown and described in FIGS. 1-3 above, each groove 40 opposing a respective groove 36. A separate pair of threaded screws 85 extend through each cap 64, and a separate pair of opposing threaded holes 84 are provided in body 62 for separately securing the respective caps to the body. End plates 70, 72 and body 62 are each secured to mounting plate 68 via suitably located screws 86.

As is best shown in FIG. 5, each channel 83 comprises a combination of holes and passages through various portions of optical fiber holder 60. For purposes of clarity, only the one indicated channel 83 will be explained in its entirety. As will be apparent from a consideration of FIGS. 4-6, each channel 83 includes one, and only one, passage portion 39 identical to the like numbered passages of FIGS. 1-3 above (i.e. sized and shaped to engage an optical fiber in a snug fit). Each passage 83 further includes a hole portion 88 extending through body 62 coaxially with passage 39, and a hole portion 90 extending through caps 64 coaxially with passage 39 and hole portion 88. When optional end-plates 70, 72 are employed, holes 92 are provided therethrough coaxially with passages 39, and holes 88, 90. Holes 88, 90 and 92, in a manner similar to holes 52 of FIG. 2 above, are circular in cross-sectional shape and sized slightly greater than the diameter of fibers 66 so as to engage the fibers in a sliding fit. As described above, such sliding fit holes can be countersunk to facilitate insertion of fibers into the fiber holder. Having described one channel 83 in detail, similar features of the channels holding the remaining optical fibers 66 will be readily apparent to the reader.

In operation, to insert a fiber 66 in optical fiber holder 60, the cap 64 which includes the groove 40 defining the passage 39 for snugly holding that fiber is loosened by loosening its respective pair of screws 85. For example, with respect to FIG. 5, to insert the third fiber 66 from the top, the third cap 64 from the left is loosened. The optical fiber 66 is subsequently slid through holes 88, 90, 92, and the separated grooves 36, 40. The screws 85 securing the loosened cap to body 62 are tightened to snugly hold the newly inserted optical fiber 66 within its channel 83.

To replace, for example, a single damaged optical fiber 66 from the five-by-five array of optical fibers, the cap 64 securing that damaged optical fiber snugly within a passage 39 is loosened. The loosened cap 64 is not removed, and none of the remaining caps are similarly loosened. The damaged optical fiber is then removed by sliding it through holes 88, 90, 92 in channel 83. Because the loosened cap is not removed, none of the remaining good optical fibers 66 held in optical fiber holder 60 are significantly disturbed. A new optical fiber 66 is slid into the position previously occupied by the damaged fiber. The screws 85 for the previously loosened cap 64 are subsequently tightened to snugly secure the new optical fiber in position. Optional end-plates 70 and 72 lend further stability to optical fibers 66 supported in optical fiber holder 60, but are not a required part of the invention.

The embodiment of the invention shown in FIGS. 4, 5 and 6 thus provides the advantage of precisely positioning an array of optical fibers while permitting easy replacement of damaged fibers without disturbing the position of remaining, undamaged fibers. Optical fiber holder 60 further provides the advantages associated with being transparent to a laser beam of a predetermined wavelength, enumerated in detail hereinabove. As also described above, mounting plate 68 can be constructed from substantially laser-transparent materials.

As a further feature of this embodiment of the invention, each cap 64 preferably extends a distance in width dimension 76 greater than body 62. Caps 64 are thus easily grasped and removed. Further, the projection of caps 64 in width dimension 76 makes their height in height dimension 78 easily determined. Because the lower edge of a cap is coextensive with a horizontal row of optical fibers 66 for which that cap defines passages 39, it is thus easy to determine which cap 64 must be loosened to remove one of a selected row of optical fiber. It will be understood that, while optical fiber holder 60 has been shown and described with semicircular grooves 36, 40 of the type shown in FIGS. 1-3 above, it can also be fabricated with the V-shaped grooves of FIG. 3A.

Figure 7:
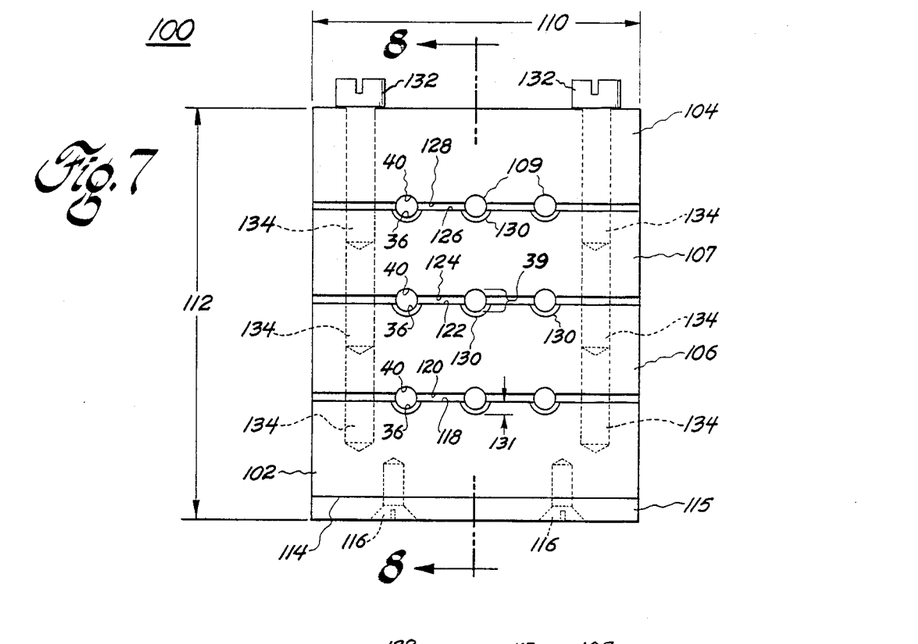
FIG. 7 is a front view of an optical fiber holder constructed in accordance with another alternate embodiment of the invention.
Figure 8:
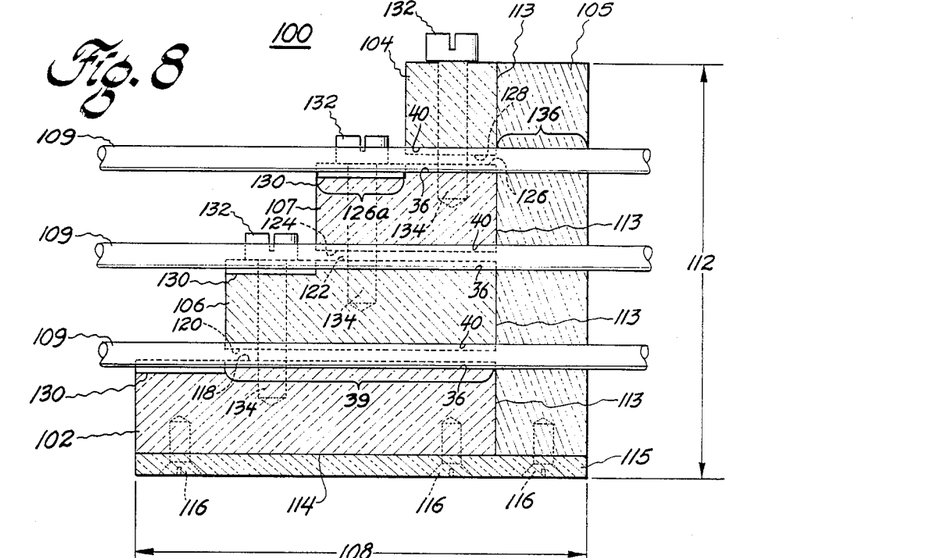
FIG. 8 is a sectional view taken along line 8—8 of FIG. 7.

Referring now to FIGS. 7 and 8, a third embodiment of the invention is shown comprising an optical fiber holder 100 including a base 102, cap 104, and two units 106, 107 disposed intermediate the cap and base. An optional end-plate 105 is disposed adjacent a longitudinal end of optical fiber holder 100. Optical fiber holder 100 holds nine optical fibers 109 in a three-by-three array, in a manner described in detail hereinbelow. Optical fiber holder 100 includes mutually perpendicular length, width and height dimensions 108, 110 and 112, respectively.

Base 102, units 106, 107 and cap 104 are each generally rectangular in shape, and include a common longitudinal side 113 abutting a flat surface of end-plate 105. Base 102, units 106, 107 and cap 104 are of progressively shorter lengths, respectively, as measured in length dimension 108 of optical fiber holder 100, so as to be in stepped relationship along the length dimension of the optical fiber holder. Base 102 includes a first, substantially flat major surface 114 secured to a mounting plate 115 by appropriate fasteners such as screws 116. Base 102 further includes a second, substantially flat major surface 118, having three parallel, substantially straight grooves 36 traversing there-across. Grooves 36 are identical in construction to the like numbered grooves of FIGS. 1-3 above.

Unit 106 includes a lower, substantially flat major surface 120 adjacent base surface 118, including three grooves 40 traversing there across in opposing relationship with respective grooves 36. Each groove 40 is likewise constructed identically to the like-numbered grooves of FIGS. 1–3 above, and each pair of grooves 36, 40 together form a channel 39 also identical to the like-numbered channels shown in these earlier described FIGURES. Unit 106 further includes an upper, substantially flat major surface 122 opposing a lower, substantially flat major surface 124 of unit 107. Unit 107 in turn includes an upper, substantially flat major surface 126 opposing a lower, substantially flat major surface 128 of cap 104. Three pairs of grooves 36, 40 are disposed in each respective pair of lower-upper adjoining surfaces 122–124 and 126–128, respectively. There are thus defined nine passages 39, three between base 102 and unit 106, three between unit 106 and unit 107, and three between unit 107 and cap 104.

Due to the stepped relationship of base 102, units 106, 107 and cap 104, each major surface 118, 122, 126 includes an exposed portion, exposed portion 126a of surface 126 being indicated for purposes of explanation. Each exposed portion of surfaces 118, 122, and 126 includes three grooves 130, one groove 130 disposed coaxially with each passage 39. Each groove 130 extends a depth 131 into its respective surface sufficient so as not to touch the optical fiber 109 extending therethrough.

A pair of threaded screws 132 extends through cap 104, and a pair of opposing threaded holes 134 is provided in unit 107 for securing the cap to the unit. Identical, separate pairs of screws 132 extend through units 106, 107, and identical, separate pairs of opposing holes 134 are provided in unit 106 and base 102, respectively, for securing unit 107 to unit 106, and unit 106 to base 102. Optional end-plate 105 includes nine holes 136, each hole being coaxial with a respective passage 39. Holes 136 are circular in cross section, and sized to engage a single optical fiber 109 in a sliding fit. Holes 136 can be countersunk to facilitate insertion of fibers into the fiber holder. End-plate 105 is secured to mounting plate 115 by appropriate fasteners such as screws 116.

The operation of optical fiber holder 100 is similar to that described with respect to optical fiber holders 20 (FIGS. 1–3) and 60 (FIGS. 4–6) above. To insert, remove, or replace any single optical fiber 109 in optical fiber holder 100, only a single pair of screws 132, associated with snugging that optical fiber into a passage 39, need be loosened. Subsequently, the cap or unit retained by the two screws 132 is loosened (but not removed), an optical fiber is slid out of optical fiber holder 100, and a new fiber similarly inserted. Additionally, where optical fibers 109 terminate in tips to the left of optical fiber holder 100, as viewed in FIG. 8, so that a laser beam may be directed at each tip, there is a reduced likelihood of damage from stray laser radiation because the tips of optical fibers 109 are spaced a relatively greater distance from holder 100. This is so since the power density of the beam falls off rapidly with distance and the stepped configuration of the holder affords an increased distance between the holder and beam source. While optical fiber holder 100 has been shown and described with semi-circular grooves 36, 40, it will be understood that it could also be fabricated with V-shaped grooves as described hereinabove. Optical fiber holder 100 also provides the advantages associated with being transparent to a laser beam of a predetermined wavelength. Mounting plate 115 can be constructed from substantially laser-transparent materials.

Figure 9:
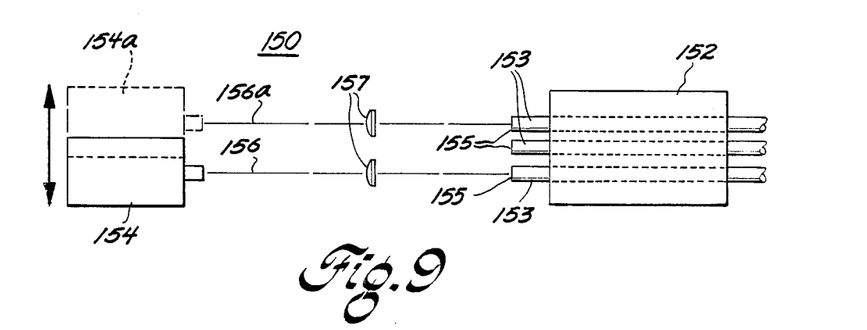
FIG. 9 is a schematic diagram illustrating an optical fiber holder, constructed in accordance with the present invention, implemented in a laser system.

Referring now to FIG. 9, a schematic drawing is shown of a high-power laser system 150 incorporating an optical fiber holder 152 constructed in accordance with the present invention for holding optical fibers 153. System 150 further includes a laser device 154 for generating a high-power laser beam 156, and lenses 157 for focusing the laser beam into tips 155 of optical fibers 153. Optical fiber holder 152 comprises, for example, any of the embodiments of the invention described hereinabove, and is constructed from materials substantially transparent to laser beam 156. Laser device 154 is movable between a first position shown in solid line, and a second position shown in dashed-line and indicated at 154a. A laser beam 156a is generated in the second position. The tip 155 of each optical fiber 153 is disposed proximate optical fiber holder 152 and between the optical fiber holder and lenses 157.

In operation, laser beam 156 is selectively directed at a tip 155 of a selected one of optical fibers 153 via the appropriate lens 157. In a manner well known in the art, the laser beam is subsequently conducted by the selected optical fiber 153 to a remote location, for example to a work piece in a remote workstation. System 150, employing an optical fiber holder constructed in accordance with the present invention, exhibits all of the advantages described hereinabove as provided by the inventive optical fiber holder 152, a significant advantage being that any stray portions of laser beam 156 not collected in a fiber 153 pass harmlessly through optical fiber holder 152.

For example and without limitation, an optical fiber holder constructed in accordance with the present invention has been used in a laser system employing a neodymium laser device generating a laser beam with a wavelength of 1.06 micrometers and operating at up to 400 watt average power, 50 Joule/pulse peak energy, and 10 kilowatt peak power. The optical fiber holder was constructed from quartz, a material substantially transparent to the beam generated by the neodymium laser device. The sizes of the various passages and holes have been selected, in accordance with the teachings hereinabove, to accommodate optical fibers of glass material having core diameters of 400–1000 micrometers. Operation of this laser system has shown that the inventive optical fiber holder taught herein positions the optical fibers precisely, and maintains this precise positioning even during the changing of one of an array of optical fibers. Further, the configuration of the passages for snugly holding the optical fibers, as taught hereinabove, provides adequate holding force without damaging the optical fibers. Stray laser beams impinging on the optical fiber holder did not affect the precise position of the optical fibers, or damage the optical fibers or the optical holder.

There are thus provided multiple embodiments of optical fiber holders, each preferably comprised substantially entirely of materials substantially transparent to a laser beam of a predetermined wavelength. Each optical fiber holder is thus particularly adaptable for use in high-power laser systems, any stray beams passing harmlessly through the holder. Each optical fiber holder is capable of precisely positioning a plurality of optical fibers during periods of normal operation. Each optical fiber holder further provides for the easy replacement of one damaged fiber in an array of fibers without disturbing the position of the remaining fibers.

A high power laser system as described and illustrated herein includes a laser device movable for the purpose of focusing the laser beam on multiple optical fiber tips. Such a system can also be constructed with the laser device held stationary and the optical fiber holder movable among a plurality of desired positions each enabling focusing of the beam on a different fiber tip.

The various optical fiber holder embodiments disclosed herein are each illustrated and described as being adapted to hold a plurality of like fibers, i.e. fibers of the same diameter. The invention is not so limited. An optical fiber holder can be constructed in accordance with the present invention to hold a plurality of optical fibers having respectively different diameters. It is only required that each groove, passage and hole in such a holder be respectively sized, in accordance with the requirements described above, to receive an optical fiber having a predetermined diameter.

While it is preferred herein that the screws used for securing the various members of the optical fiber holders illustrated herein be fabricated of a laser beam transparent material, the invention is not so limited. Since the screws are generally not located in immediate proximity of any optical fibers, it is extremely unlikely that full laser beam power will fall incident on any screw. Therefore, the screws can be fabricated of any convenient material, e.g. metal.

While a preferred embodiment of the invention has been illustrated and described, it will be clear that the invention is not so limited. Numerous modifications, changes, variations, substitutions and equivalents will occur to those skilled in the art without departing from the spirit and scope of the present invention. Accordingly, it is intended that the invention herein be limited only by the scope of the appended claims.

What is claimed is:

1. An optical fiber holder for holding at least one optical fiber, comprising:
    a base including a generally flat base surface and defining at least one substantially straight groove transversing said base surface;
    a cap including a generally flat cap surface adjacent to said base surface;
    said cap defining at least one substantially straight groove traversing said cap surface in opposing relationship to said groove in said base surface so as to form a passage shaped to accommodate said optical fiber in a snug fit;
    means for affixing said cap to said base so as to secure said optical fiber against motion in said passage; and
    said base and said cap each comprising a material which is substantially transparent to a laser beam at a predetermined wavelength, so that a stray laser beam impinging on said cap or said base passes harmlessly therethrough.

2. The optical fiber holder of claim 1 wherein said optical fiber holder is adapted to hold an optical fiber generally circular in cross-section; and
    each of said grooves is generally semicircular in cross-sectional shape and extends into its respective surface a distance less than the radius of said optical fiber such that a gap is maintained between said cap and base surfaces when said optical fiber is disposed in said optical fiber holder.

3. The optical fiber holder of claim 1 wherein said optical fiber holder is adapted to hold an optical fiber generally circular in cross-section; and
    each of said grooves is generally V-shaped and sized such that a gap is maintained between said cap and base surfaces when said optical fiber is disposed in said optical fiber holder.

4. The optical fiber holder of claim 1 wherein said cap and said base each include a plurality of said grooves disposed to form a like plurality of said passages so as to accommodate a like plurality of optical fibers.

5. The optical fiber holder of claim 4 wherein said plurality of passages are each of like dimension so as to accommodate like optical fibers.

6. The optical fiber holder of claim 1 and further including:
    a body comprising a material transparent to said laser beam;
    said body fixed relative to said base;
    said body defining a hole extending there through and disposed coaxially with said passage; and
    said hole shaped to accommodate said optical fiber in a sliding fit.

7. An optical fiber holder for holding a plurality of optical fibers comprising:
    a base including a generally flat base surface defining at least one substantially straight groove traversing said base surface;
    a cap including a generally flat cap surface defining at least one substantially straight groove traversing said cap surface;
    at least one unit disposed between said cap and said base, said unit including a generally flat lower surface adjacent to said base surface and a generally flat upper surface adjacent to said cap surface;
    said unit defining at least one substantially straight groove traversing said unit lower surface in opposing relationship to said groove in said base surface so as to form a passage shaped to accommodate an optical fiber in a snug fit;
    said unit further defining at least one substantially straight groove traversing said unit upper surface in opposing relationship to said groove in said cap surface so as to form another said passage shaped to accommodate another optical fiber in a snug fit; and
    means for affixing said unit to said base and said cap to said unit so as to secure said optical fibers against motion in their respective passages.

8. The optical fiber holder of claim 7 wherein said cap, said base and said unit each comprise a material substantially transparent to a laser beam at a predetermined wavelength.

9. The optical fiber holder of claim 7 wherein said optical fiber holder is adapted to hold optical fibers each having a generally circular cross-sectional shape; and
    each of said grooves is generally semicircular in cross-sectional shape and extends into its respective surface a distance less than the radius of its corresponding optical fiber such that gaps are respectively maintained between said cap and unit upper surfaces and between said base and unit lower surfaces when optical fibers are disposed in said optical fiber holder.

10. The optical fiber holder of claim 7 wherein said optical fiber holder is adapted to hold optical fibers each generally circular in cross-section; and each of said grooves is generally V-shaped and sized such that gaps are respectively maintained between said cap unit upper surfaces and between said base and unit lower surfaces when optical fibers are disposed in said optical fiber holder.

11. The optical fiber holder of claim 8 further including:
- a plurality of said units stacked between said cap and base, the upper surface of each stacked unit adjoining the lower surface of its adjacent stacked unit; and
- the grooves in each pair of adjoining unit upper and lower surfaces disposed in opposing relationship to form another said passage.

12. The optical fiber holder of claim 8 wherein said optical fiber holder includes mutually perpendicular width, length and height dimensions;
- the grooves in each said base, unit and cap disposed generally parallel to said length dimension of said optical fiber holder;
- said base, unit and cap stacked in said height dimension of said optical fiber holder;
- the length of said unit shorter than the length of said base as measured in said length dimension of said optical fiber holder;
- the length of said cap shorter than the length of said unit as measured in said length dimension of said optical fiber holder;
- said base, unit and cap positioned in stepped relationship with one another so as to expose stepped portions of said base surface and said unit upper surface; and
- the stepped portions of said base surface and said unit upper surface including channels in axial alignment with said passages for accommodating optical fibers.

13. The optical fiber holder of claim 12 wherein said affixing means includes:
- first means for affixing said unit to said base; and
- second means for affixing said cap to said unit.

14. The optical fiber holder of claim 12 wherein said channels are of generally semicircular cross section and substantially larger diameter than said optical fibers.

15. The optical fiber holder of claim 14 wherein said base, unit and cap are each generally rectangular in shape and include an end surface aligned to form a common end of said optical fiber holder at which said passages terminate;
said optical fiber holder further including:
- an end plate adjoining said end surface of said optical fiber holder comprising a material transparent to said laser beam;
- said end plate fixed relative to said optical fiber holder;
- said end plate defining a respective hole extending there through disposed coaxially with each of said passages; and
- each of said holes shaped to accommodate an optical fiber in a sliding fit.

16. The optical fiber holder of claim 15 wherein said base surface, cap surface and unit upper and lower surfaces each include a plurality of said grooves disposed to form a like plurality of said passages so as to accommodate a like plurality of said optical fibers in a snug fit.

17. The optical fiber holder of claim 16 wherein said plurality of passages are each of like dimension so as to accommodate like optical fibers.

18. An optical fiber holder defining at least two fiber channels for holding at least two optical fibers comprising:
- a body having mutually perpendicular length and height dimensions and including at least two substantially flat body surfaces disposed in substantially parallel planes so as to be stepped in said height dimension of said body;
- said body defining at least one substantially straight groove traversing each of said body surfaces generally parallel to said length dimension of said body;
- a separate cap adjoining each of said body surfaces, each of said caps including a substantially flat cap surface adjacent its corresponding body surface, each of said cap surfaces including a substantially straight groove disposed in opposing relationship to the groove in its corresponding body surface so as to form a passage portion of said fiber channel shaped to accommodate one of said optical fibers in a snug fit;
- each of said fiber channels further defined by hole portions in regions of said body and caps axially aligned with each of said passage portions, each of said hole portions shaped to accommodate one of said optical fibers in a sliding fit; and
- means for affixing each of said caps to said body so as to snugly secure optical fibers in said passages.

19. The optical fiber holder of claim 18 wherein said body and said caps each comprise a material substantially transparent to a laser beam at a predetermined wavelength.

20. The optical fiber holder of claim 19 wherein said optical fiber holder is adapted to hold optical fibers each having a generally circular cross-sectional shape;
- each of said grooves is generally semicircular in cross-sectional shape and extends into its respective surface a distance less than the radius of the optical fiber accommodated therein such that a gap is maintained between said cap and base surfaces when said optical fiber is disposed in said optical fiber holder; and
- each of said hole portions is generally circular in cross-sectional shape and has a diameter slightly larger than the diameter of the optical fiber accommodated therein.

21. The optical fiber holder of claim 19 wherein said optical fiber holder is adapted to hold optical fibers each generally circular in cross-section;
- each of said grooves is generally V-shaped and sized such that a gap is maintained between said cap and base surfaces when said optical fiber is disposed in said optical fiber holder; and
- each of said hole portions is generally circular in cross-sectional shape and has a diameter slightly larger than the diameter of the optical fiber accommodated therein.

22. The optical fiber holder of claim 19 wherein said body includes five of said body surfaces stepped in said height dimension of said body; and
- each of said body surfaces and its corresponding cap surface including five of said grooves for forming five of said passages;
- whereby said optical fiber holder accommodates twenty-five of said optical fibers in a five-by-five array.

23. The optical fiber holder of claim 22 wherein said passages are aligned in said height and width dimension of said body to form a generally rectangular array.

24. The optical fiber holder of claim 22 wherein said passages are each of like dimension so as to accommodate twenty-five like optical fibers.

25. Apparatus comprising:
   a laser device capable of emitting a laser beam of a predetermined wavelength;
   an optical fiber holder;
   an optical fiber including a tip for receiving said laser beam;
   said optical fiber disposed in said optical fiber holder with said tip proximate said optical fiber holder;
   means for directing said laser beam at said optical fiber tip; and
   said optical fiber holder comprising a material substantially transparent to said laser beam so that any portion of said laser beam directed against said optical fiber holder passes there through without damaging said optical fiber holder.

26. The apparatus of claim 25 wherein said optical fiber holder comprises:
   a base including a generally flat base surface and defining at least one substantially straight groove traversing said base surface;
   a cap including a generally flat cap surface adjacent to said base surface;
   said cap defining at least one substantially straight groove traversing said cap surface in opposing relationship to said groove in said base surface so as to form a passage shaped to accommodate said optical fiber in a snug fit; and
   means for affixing said cap to said base so as to secure said optical fiber against motion in said passage.

27. The apparatus of claim 26 wherein said optical fiber has a generally circular cross-sectional shape; and
   each of said grooves is generally semicircular in cross-sectional shape and extends into its respective surface a distance less than the radius of said optical fiber such that a gap is maintained between said cap and base surfaces when said optical fiber is disposed in said optical fiber holder.

28. The apparatus of claim 26 wherein said optical fiber has a generally circular cross-sectional shape; and
   each of said grooves is generally V-shaped and sized such that a gap is maintained between said cap and base surfaces when said optical fiber is disposed in said optical fiber holder.

29. The apparatus of claim 26 wherein said cap and said base each include a plurality of said grooves disposed to form a like plurality of said passages so as to accommodate a like plurality of optical fibers.

30. The optical fiber holder of claim 29 wherein said plurality of passages are each of like dimension so as to accommodate like optical fibers.

31. The apparatus of claim 26 and further including:
   a body comprising a material transparent to said laser beam;
   said body fixed relative to said base;
   said body defining a hole extending there through and disposed coaxially with said passage; and
   said hole shaped to accommodate said optical fiber in a sliding fit.

* * * * *